United States Patent [19]

Habermann

[11] 4,353,602
[45] Oct. 12, 1982

[54] AXIAL ELECTROMAGNETIC BEARING FOR SMOOTH SHAFTS OF LARGE DIAMETER

[75] Inventor: Helmut Habermann, Vernon, France

[73] Assignee: Societe Europeenne de Propulsion, Puteaux, France

[21] Appl. No.: 92,494

[22] Filed: Nov. 8, 1979

Related U.S. Application Data

[63] Continuation of Ser. No. 867,522, Jan. 6, 1978, abandoned.

[30] Foreign Application Priority Data

Jan. 12, 1977 [FR] France .............................. 77 00766

[51] Int. Cl.³ .......................................... F16C 39/06
[52] U.S. Cl. ................................................... 308/10
[58] Field of Search ........................................... 308/10

[56] References Cited

U.S. PATENT DOCUMENTS 3,455,612  7/1969  Heeb ..................................... 308/10
4,065,189  12/1977  Sikorra ................................ 308/10
4,141,604  2/1979  Habermann ........................... 308/10

FOREIGN PATENT DOCUMENTS 2331613  1/1975  Fed. Rep. of Germany ........ 308/10
2149644  3/1973  France .................................. 308/10
1345766  2/1974  United Kingdom ................. 308/10

*Primary Examiner*—R. Skudy
*Attorney, Agent, or Firm*—Eyre, Mann, Lucas & Just

[57] ABSTRACT

An axial electromagnetic bearing for smooth shafts of large diameter and relatively shorter length of the type comprising a stator of substantially annular shape and an armature in the shape of a disc attached to the shaft and located facing the stator, at least one axial position detector for the shaft being associated with the axial bearing, and the bearing being characterized in that the stator of the axial bearing is composed of four independent sectors each of which comprises a ferromagnetic core and a winding and each of the independent sectors of the stator of the axial bearing being controlled by at least one corresponding detector determining the axial position of the shaft in relation to the said sector.

7 Claims, 7 Drawing Figures

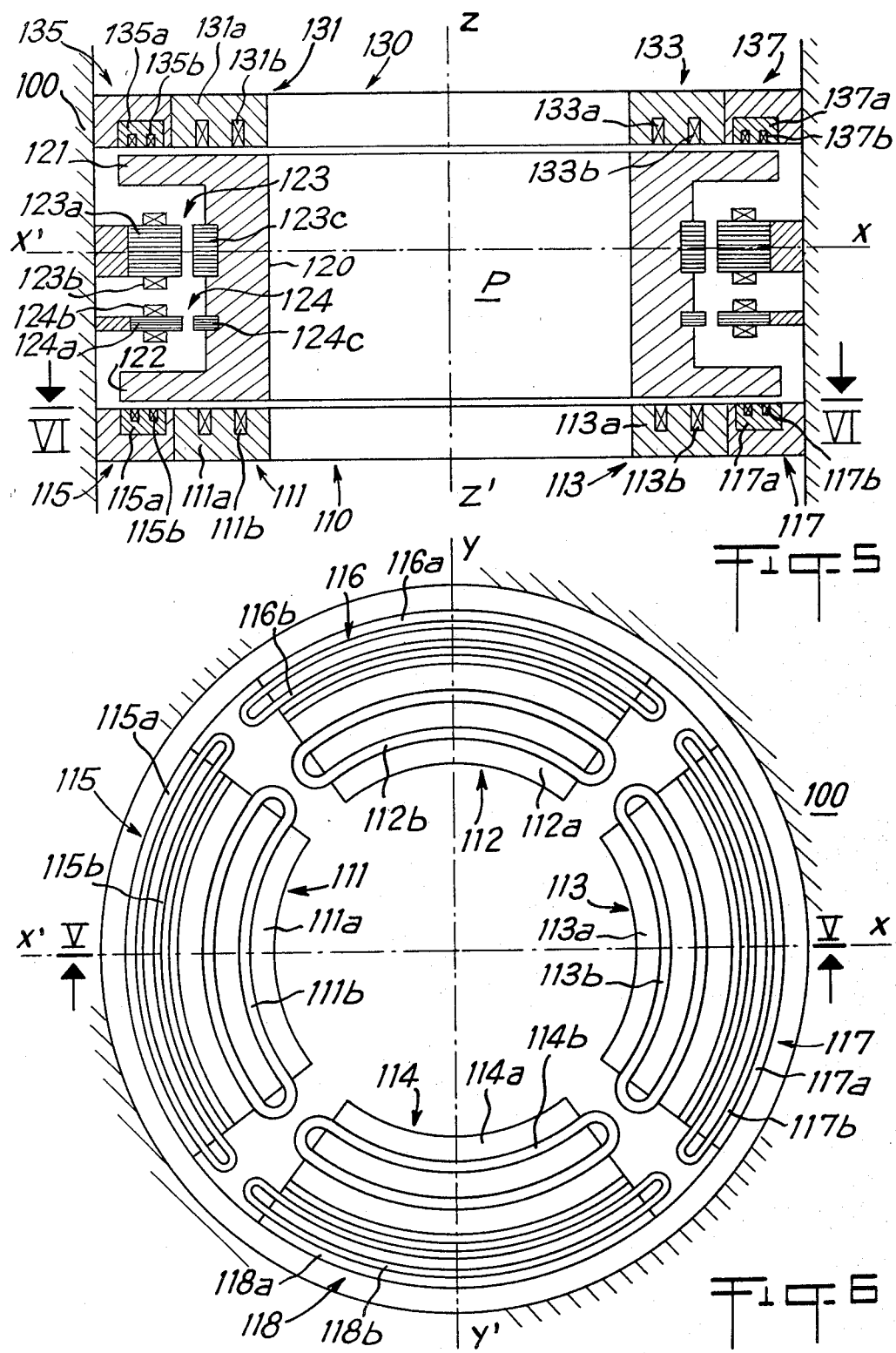

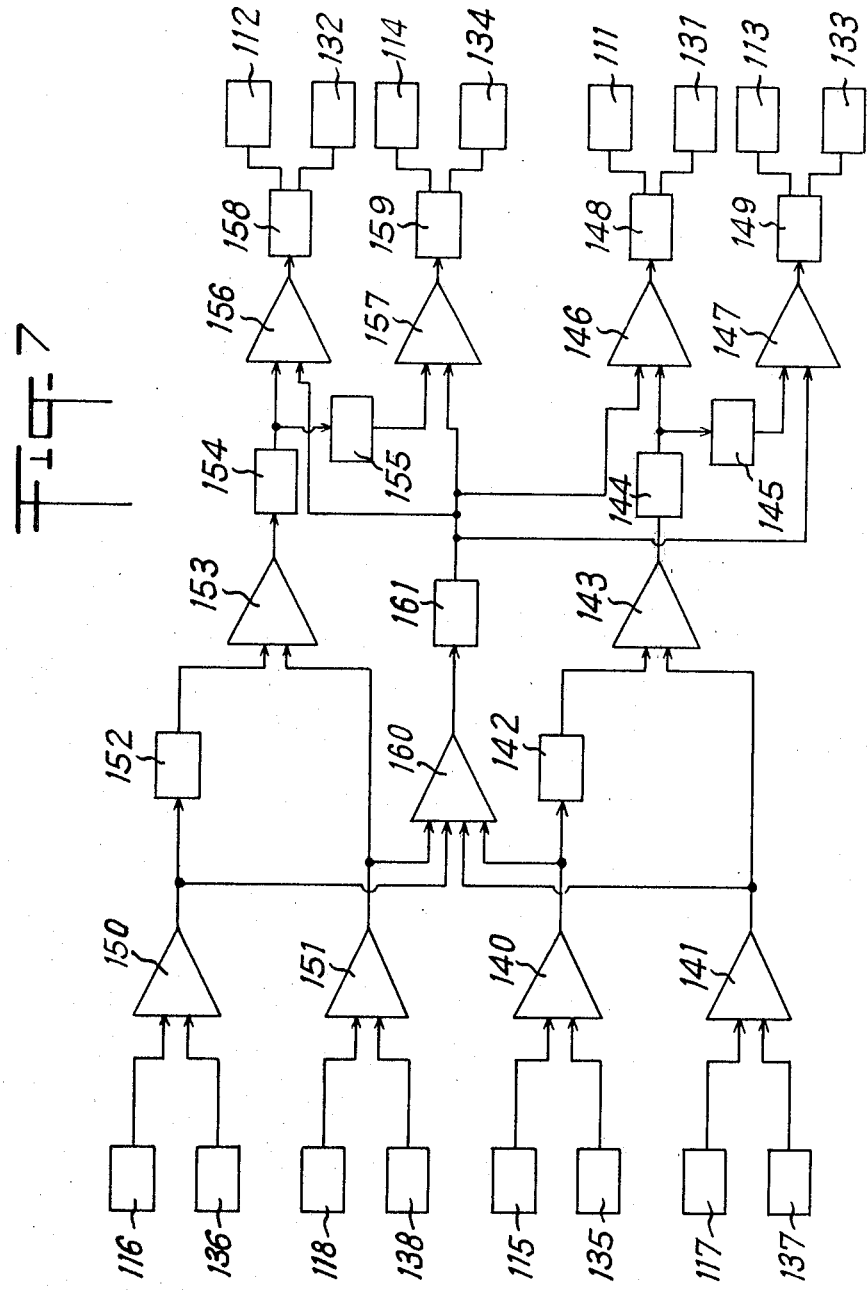

AXIAL ELECTROMAGNETIC BEARING FOR SMOOTH SHAFTS OF LARGE DIAMETER

This is a continuation of application Ser. No. 867,522 filed Jan. 6, 1978 now abandoned.

The present invention relates to the mounting of a short shaft of relatively larger diameter with the help of magnetic bearings controlled by shaft position detectors. The invention relates in particular to an axial electromagnetic bearing for smoothshafts of large diameter and short length, of the type comprising a stator of substantially annular shape and a disc armature attached to the shaft and located facing the stator, at least one detector detecting the axial position of the shaft being associated with the axial bearing.

An example of a known shaft mounting using electromagnetic bearings is diagrammatically shown in FIG. 1. A shaft 2 with an axis ZZ' is suspended on a frame 1 exclusively by an assembly of radial electromagnetic bearings controlled by detectors. Two radial electromagnetic bearings 3 and 4 respectively controlled by radial detectors 5 and 6 are located respectively in the neighbourhood of each end of the shaft 2 in the planes $P_1$ and $P_2$ moreover at least one axial abutment 7 controlled by an axial detector 8 is located at the end of the shaft 2. Each of the radial electromagnetic bearings 3, 4, which comprises an annular armature mounted on the shaft 2 and a stator wound around this annular armature and which is controlled by a radial detector, prevents all radial displacements of the axis of rotation of the shaft 2. However, since the shaft 2 is entered radially at two places spaced from each other, the appearance of nutational or precessional movements of the axis of rotation of the shaft 2 are prevented. In addition the axial bearing 7 controlled by the axial detector 8 prevents the shaft 2 moving all axial directions. Thus, the assembly of the magnetic bearings 3, 4, 7 when active constitutes a magnetic suspension of the shaft 2 with five controlled axes (control of the translational movement of the shaft 2 along the axis ZZ' with the help of the axial abutment 7, control of translational movements of the shaft 2 along two normal radial axes with the help of each of the radial bearings 3 and 4, and control of rational movements around the said normal radial axes with the help of the assembly of the two radial bearings 3 and 4).

When the shaft 2 is in the shape of a short shaft of large diameter, and notably when the shaft is in the form of a disc, it is not possible to dispose two radial bearings in the two different radial planes $P_1$ and $P_2$, because of lack of space. Accordingly, in a known manner, such a shape of shaft can be suspended only by a single radial bearing, which prevents translational movements in the radial direction but cannot act against rotational movements of the shaft in relation to the radial axes, and by one or two axial bearings at the ends of the shaft, which prevent simply translational movements of the shaft in an axial direction. Thus, the known mountings of the shaft do not enable a magnetic suspension with five control axes to be effected for a shaft of short length and with a rotor in disc form.

It is an object of the present invention to obviate or mitigate the aforesaid drawbacks and permit magnetic suspension of a rotor of small length and large diameter by controlling simultaneously axial and radial movements thereof, and movements of oscillation and precession, without increasing the bulk of the mounting.

These objects are achieved by an axial electromagnetic bearing of the type defined, in which, according to the invention, the stator of the bearing is constituted by four independent sectors, each comprising a ferromagnetic core and a winding and each being controlled by at least one corresponding detector appropriate to the axial position of the shaft relative to the said sector.

The four sectors are preferably symmetrical in a plane radial relative to two normal axes.

In one embodiment of the invention, the sectors are identical. They may be slightly spaced apart from one another and do not extend over the entire annular surface corresponding to the armature of the axial bearing.

A feature of the invention is that each winding is a loop incorporated in its sector and providing, in the radial sense of the sector two opposed outside poles of the same polarity and an inside pole of opposite polarity.

The detectors may alternate with the sectors or be disposed radially thereof.

The invention also includes an axial bearing in which the stator comprises first and second parts disposed on opposite sides of the armature, each part comprising four independent sectors whereof each is constituted by a ferromagnetic core and a winding, the sectors of the first and second parts being symmetrical relative to the armature, and two sectors of the first and second parts being controlled by a detector for detecting the axial position of the shaft relative to at least one of said sectors.

The invention also provided a magnetic suspension system for a rotor of large diameter and relatively smaller length comprising at least one axial electromagnetic bearing and at least one radial electromagnetic bearing controlled respectively by detectors controlling axial and radial positions of the rotor, the axial bearing being as defined above and being associated with four axial detectors each controlling one of four sectors or groups of detectors defining the stator of the axial bearing so as to control simultaneously movement of the shaft in the axial sense and rocking movements of the two normal radial axes, the radial bearing being associated with a shaft radial-position detector so as to control radial movements of the shaft.

The system may comprise at each end of the rotor an axial bearing as defined above and associated with four shaft axial-position detectors respectively controlling each of four sectors or groups of sectors comprising the stator of the axial bearing so as to control simultaneously axial movement of the shaft and rocking movement of the shaft about two normal radial axes, and a radial electromagnetic bearing associated with a rotor radial-position detector for controlling radial movements of the rotor.

Rotor mountings according to the invention employ an axial electromagnetic bearing comprising a plurality of independent parts which permits not only maintaining of the shaft against any axial displacement or controlled axial displacement but also subdues any oscillatory or precessive movement of the axis of rotation of the shaft, due to the fact that two diametrically opposite sectors of the stator cooperate and act differentially to control any rocking of the shaft around a diametrical axis perpendicular to the diametrical axis of symmetry passing through the two sectors. Thus, the ocntrol of oscillatory and precessive movements of the shaft is effected by action on the plane end faces of, or connected to, the rotor and not on the edges of the rotor.

The rotor can thus be of as reduced a length as possible since it is sufficient to dispose a single annular radial bearing concentric with the shaft to maintain it against radial movements and the bulkness in length is not increased it is the same disc armature which, divided, ensure control of the rocking movements of the shaft.

The present invention will now be described by way of example with reference to the accompanying drawings in which:

FIG. 5 is a diagrammatic cross-sectional view on the line V—V of FIG. 6 showing the mounting of a shaft of short length between two divided axial electromagnetic bearings and a single axial electromagnetic bearing;

FIG. 6 is a cross-sectional view on the line VI—VI of FIG. 5; and

FIG. 7 is an electric circuit diagram showing an example of control circuit for the axial bearings shown in FIGS. 5 and 6.

Figure 3:
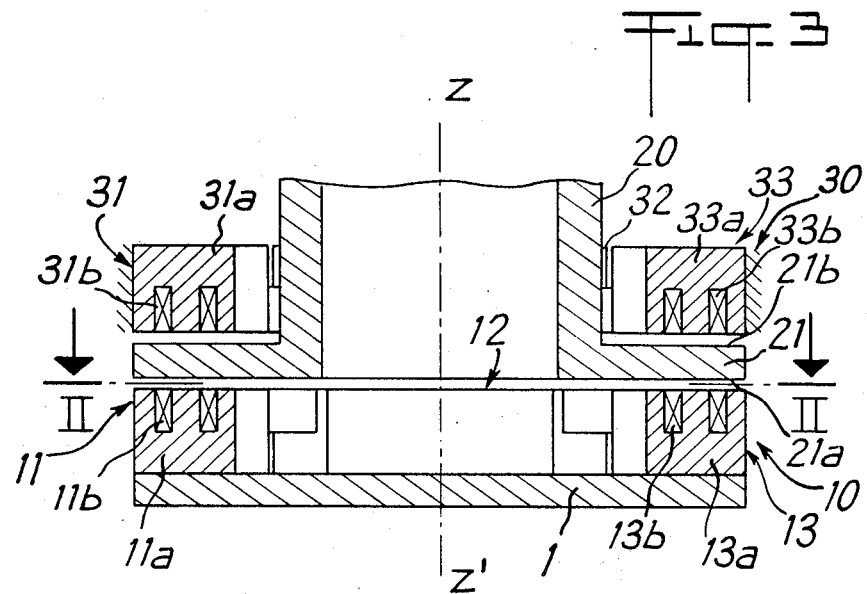
FIG. 3 is an axial cross-section on the line III—III of FIG. 2 in which a stator comprising two portions is situated symmetrically on either side of a rotor connected to the shaft.
Figure 2:
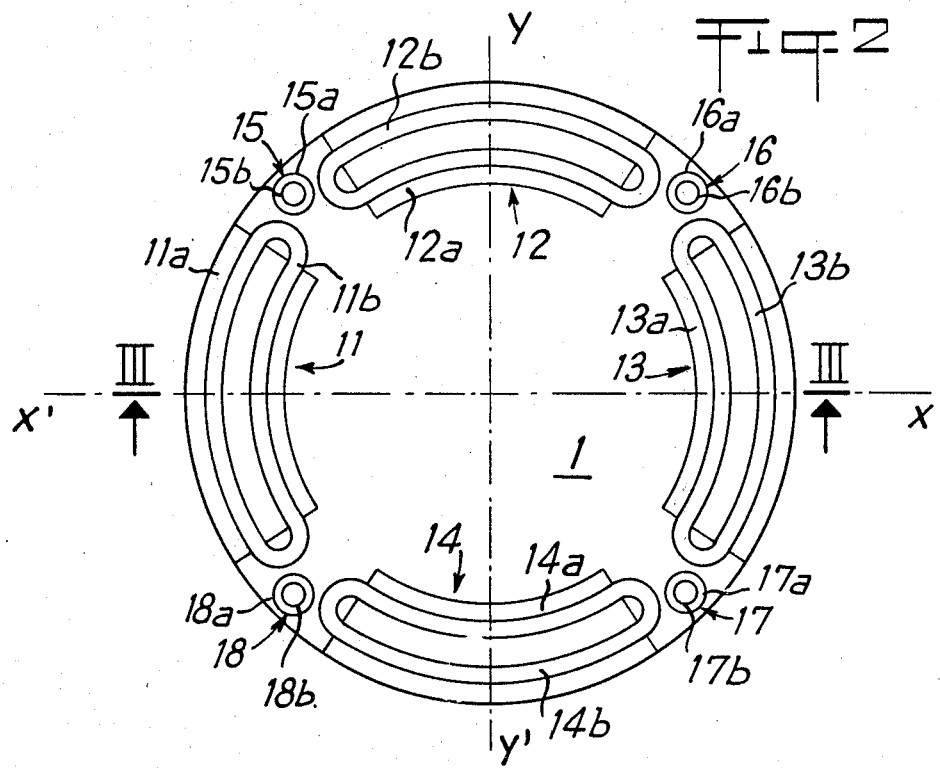
FIG. 2 is a cross-section on the line II—II of FIG. 3 of an embodiment of axial bearing according to the invention with associated detectors.

Referring to FIGS. 2 and 3, there is shown an assembly 10 which comprises a first portion of a stator of an axial bearing facing the end face 21a of the rotor 21 of a shaft 20 of relatively large diameter and short length. A second portion 30 of the stator, identical to the portion 10, is situated facing the opposite face 21b of the rotor 21 of the shaft 20. Each of these portions 10 and 30 of the stator has a generally annular shape and comprises four parts 11, 12, 13, 14 and 31, 32, 33, 34 respectively, which comprise independent sectors each constituting ferromagnetic cores 11a, 12a, 13a, 14a, 31a, 32a, 33a, 34a and windings 11b, 12b, 13b, 14b, 31b, 32b, 33b and 34b, respectively. Each of the four sectors of one portion of the stator 10, 30 is controlled by at least one of the detectors 15, 16, 17, 18 which determine the axial position of the shaft 26 in relation to the surface of the portions 10, 30 of the axial bearing 10, 21, 30.

Figure 1:
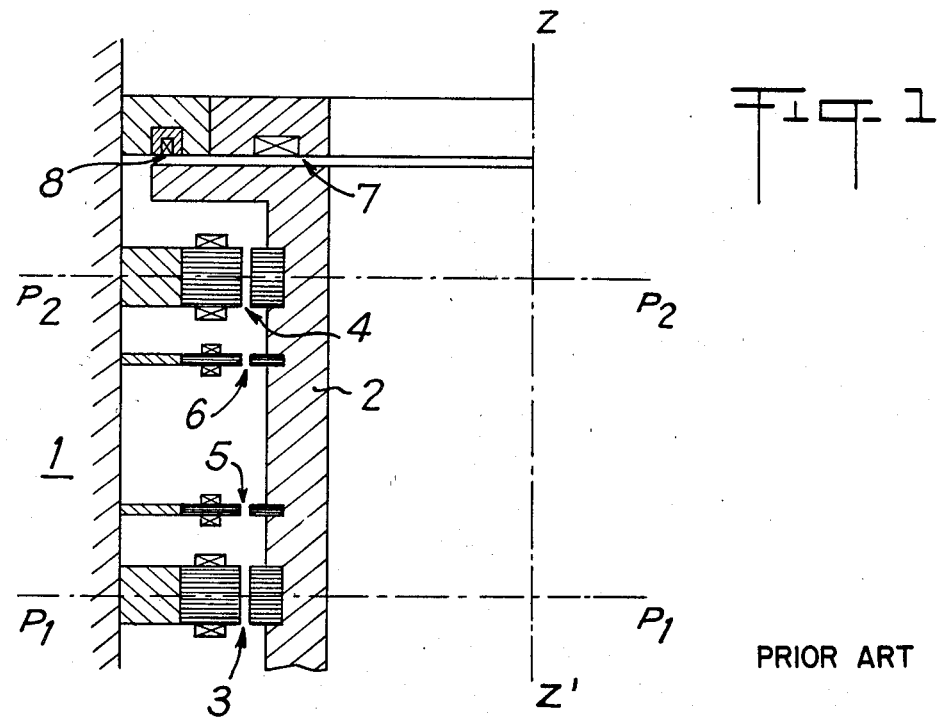
FIG. 1 is a diagrammatic view in partial cross-section of a known arrangement of a shaft and magnetic bearing.
Figure 4:
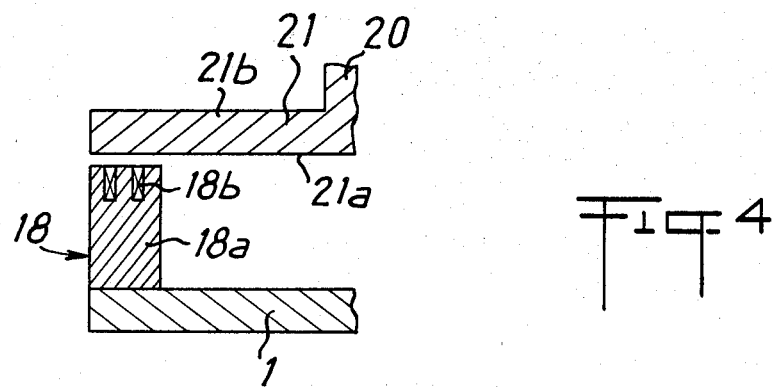
FIG. 4 is a cross-section on the line IV—IV of FIG. 2, which shows an armature of detector.

The four annular sectors 11, 12, 13, 14 and 31, 32, 33, 34 of one portion of the stator 10, 30 are symmetrical in a radial plane with respect to two normal axes X'X and Y'Y of this plane. In the embodiment shown in FIGS. 2 to 4, the four annular sectors of one portion of the sector 10,. 30 are slightly spaced apart with respect to each other and do not cover all the corresponding annular surface of the rotor 21 of the axial bearing 10, 21, 30. Detectors 15 to 18 are interposed in the spaces left free between the various annular sectors 11 to 14. The detectors 15 to 18 can be of electromagnetic type and comprise, as can be seen in FIG. 4 for the detector 18, a fixed armature comprising a ferromagnetic core 18a enclosing a winding 18b and located facing the face 21a of the rotor 21 of the shaft 20. The ferromagnetic cores and the windings of the detectors 15 to 17 carry respectively the same reference numerals 15a to 17a and 15b to 17b. Each annular sector 11, 12, 13, 14 of the stator of the axial bearing is controlled by at least one of the detectors 15 to 18. Each sector 11 to 14 can be controlled by one of two adjacent detectors or with the help of a signal which is a combination of the signals emitted by the two detectors situated on either side of the annular sector under consideration. The annular sectors 31 to 34 of the portion 30 of the stator can be controlled with the help of its own detector which would be similar to the detectors 15 to 18 and symmetrical to the latter in relation to the rotor 21 of the shaft 20. Moreover, the sectors 31 to 34 can be advantageously controlled by the same detectors 15 to 18 as the sectors of the first portion of the stator. Thus, each sector 31 to 34 cooperates with the corresponding sector 11 to 14 which is opposite to it, at least in so far as the emitted signals from at least one of the nearest detectors is involved, that is to say from the detectors 15 to 18 respectively.

Each winding 11b to 14b, and 31b to 34b, constituted a loop incorporated in the corresponding sector 11 to 14 and 31 to 34 and forms, in a radial direction with respect to the sector, two poles of the same type, for example two south poles at either end of the loop, and a pole of the opposite type, which is then a north pole according to the chosen example, in the interior of the loop.

It is not necessary for the stator of the axial bearing according to the invention to comprise two portions 10 and 30 situated on either side of the rotor 21 attached to the shaft 20. A single portion of the stator such as 10, comprising four sectors 11 to 14 and associated with four detectors 15 to 18 would be sufficient, the action of the second portion 30 only reinforcing that of the first portion 10. It is no longer necessary for the detectors to be interposed between the different sectors of the stator. Thus, each detector can be positioned in the extension, in the radial direction, of a sector of the stator of the bearing, either along the external periphery of the said sector or along the internal periphery. This appears in a second embodiment of the invention shown in FIGS. 5 and 6.

FIGS. 5 and 6 shown a complete magnetic suspension of a shaft 120 according to the invention. The shaft 120 is supported at each end by an axial electromagnetic bearing 110, 130, whereas a radial electromagnetic bearing 123, controlled by a detector 124 for the radial position of the shaft, is situated in a radial plane P which is substantially a median plane of the shaft 120.

The radial bearing 123 comprises in classical fashion an annular armature 123c mounted on the shaft 120 and a stator comprising a pole piece 123a and windings 123b. The detector 124 associated with the radial electromagnetic bearing 123 is equally advantageously of an electromagnetic type and comprises an annular armature 124c attached to the shaft 120 and situated facing a fixed stator comprising a pole piece 124a and windings 124b.

Each of axial end bearings 110 and 130 is analogous to an axial bearing described with references to FIGS. 2 and 3 and has a stator which comprises four independent annular sectors, 111 to 114, and 131 to 134 respectively, which are similar to the sectors 11 to 14 or 31 to 34 previously described. Each sector of the stator, 111 to 114 and 131 to 134 is controlled respectively by a detector 115 to 118 and 135 to 138. Each detector is located, in a radial direction, in the extended length of the annular sector of the stator of the axial bearing which it controls, and comprises a ferromagnetic core, bearing the reference a, in which is disposed a winding, bearing the reference b, which winding constitutes, similar to the windings of the stator of the axial bearing, a loop in a plane parallel to the rotor armature formed by the end 121 or 122 of the shaft 120. Each stator 111 to 114, 131 to 134 of the bearing associated with a stator of the detector 115 to 118, 135 to 138 respectively is attached to a fixed wall 100. The bearing 130 is symmetrical to the bearing 110 with regard to a radial median plane and the stators of the bearing 131 to 134 are respectively symmetrical to the stators fo the bearing 111 to 114, whereas the stators of the detectors 135 to 138 are respectively symmetrical to the stators of the detectors 115 to 118. The construction of the bearing 123 and the radial detector 124 is not described in detail because these elements are known. Thus, the iron pole piece or core 123a is of the type comprising an exterior annular part and radial branches extending towards the interior and each surrounded by a winding such as 123b in which the winding direction is opposite to that of a winding of the other and uniformly spaced through the interior periphery of the core 123a. The use of laterally disposed isolated bundles of sheets or laminated iron sheets for the polar core 123a and the armature 123c limits the loss caused by Eddy currents and the heating of the electromagnetic parts. The detector 124 regulates the excitation of the radial bearing 123 so as to correct at each instant the radial position of the shaft 120 in the plane P. Thus, the translational movements of the rotor 120 in the radial direction along the directions X'X and Y'Y are controlled at the level of the plane P, whereas nutational and / or conical procession, which correspond to rotations around parallel axes to the axes X'X and Y'Y, as well as translational displacements of the shaft 120 in the axial direction along the axis Z'Z are controlled with the help of divided axial bearings 110 and 130 associated wiht their respective detectors.

The divided axial bearings 110 and 130 can be controlled from the detectors 115 to 118 and 135 to 138 and the radial bearing 123 from the detector 124 with the help of a control circuit such as that described in French Pat. No. 2 149 644.

In the case of the arrangement shown in FIGS. 5 and 6, each axial bearing comprises four electromagnets referenced 111 to 114 for the bearing 110 and 131 to 134 for the bearing 130. The control of the rotation around an axis parallel to the direction XX' and around an axis parallel to YY' can be effected notably from a combination of the signals delivered by different axial detectors associated with various elements of the axial bearings in the manner described below with reference to FIG. 7.

The pair of detectors 115 and 135 which control the axial position of the shaft 120 in relation to the two opposite sectors 111 and 131 of the bearing, and the pair of detectors 117 and 137 which control the axial position of the shaft 120 in relation to the two opposite sectors 113 and 133 of bearing, deliver signals which are respectively fed into two signal adders 140 and 141. The signals emitted by the detectors 115 and 135 are fed to the adder 141. The two signal adders 140 and 141 are connected, one through the intermediary of a signal inverter 142, and the other directly, to a signal adder 143 which is itself connected to a phase-shifting network 144, which network is itself connected to a signal adder 146 which acts on an amplifier 148 controlling the two electromagnets 111 and 131, moreover the same phase-shifting network 144 is connected through the intermediary of a signal inverter 145 to a signal adder 147 which acts on an amplifier 149 controlling the two electromagnets 113 and 133. One such control loop controls rotation around an axis parallel to the direction YY'.

In a similar fashion, the detectors 16 and 136 which control the axial position of the shaft 120 in relation to two opposite sectors 112 and 132 of the bearing are connected to a signal adder 150 whereas the detectors 118 and 138 which control the axial position of the shaft 120 in relation to two opposite sectors 114 and 134 of the bearing are connected to a signal adder 151. The two signal adders 150 and 151 are connected, one through the intermediary of a signal inverter 152 and the other directly, to a signal adder 153 which is itself connected to a phase-shifting network 154, which network 154 is itself connected to a signal adder 156 acting on an amplifier 158 controlling the two electromagnets 112 and 132, moreover the same phase shifting network 154 is connected through the intermediary of a signal inverter 155 to a signal adder 157 which acts as an amplifier 159 controlling the two electromagnets 114 and 134. One such control loop controls rotation around an axis parallel to the direction XX'.

Control of axial translation parallel to the axis ZZ' can be effected as follows. The four pairs of axially positioned detectors, respectively the pairs 115, 135; 116, 136; 117, 137; 118, 138 define the direction of translation ZZ' and are connected respectively to signal adders 140, 150, 141 and 151. Each of these adders 140, 150, 141 and 151 is connected to a phase-shifting network 161 in a narrow band. This latter circuit 161 is itself connected to each of the signal adders 146, 156, 147, 157 which are connected respectively to amplifiers 148, 158, 149, 159 to control the pairs of electromagnets 111, 131; 112, 132; 113; 133 and 114, 134.

The control of radial translation parallel to axes XX' and YY' of the radial bearing 123 can be effected in a known manner from the signals supplied by the radial detector 124.

Thus a magnetic suspension on five control axes (which correspond to three translational degrees of freedom along the axes XX', YY' and ZZ', and to two rotational degrees of freedom around the axes XX' and YY') can be effected with the help of an active radial bearing associated with two active bearings according to the present invention.

It is to be noted tht it is only necessary to use two axial detectors for each axial bearing 110 or 130, it beiong preferable, however, to operate with four axial detectors with each axial bearing as previously described.

Of course, various modifications and/or additions can be made by persons skilled in the art to the arrangement which has just been described only by way of non-limiting example without departing from the scope of protection of the invention.

I claim:

1. A magnetic suspension system for a rotor of large diameter and relatively smaller length, comprising at least one axial electromagnetic bearing and one radial electromagnetic bearing, said radial electromagnetic bearing being controlled by a shaft radial position detector, but said axial bearing including a stator constituted by first and second parts disposed on opposite sides of an armature integral with said rotor, each said part consisting essentially of four independent sectors wherein each said independent sector includes a ferromagnetic core and a winding wherein the only magnetic flux is electromagnetic flux, and a detector integral with each independent sector, the sectors of the first and second parts being symmetrically disposed relative to the armature, and each detector controlling one of the said sectors or groups of sectors defining the stator of the axial bearing so as to control simultaneously the movement of the shaft in the axial sense and rocking movement relative to the two normal radial axes.

2. A system according to claim 1, wherein the four independent sectors of each said parts are identical.

3. A system according to claim 2, wherein the four indepedent sectors of each said parts are slightly spaced from one another.

4. A system according to claim 3, wherein the four independent sectors of each said parts are symmetrical in a radial plane relative to two normal axes.

5. A system as claimed in claim 1, wherein each winding comprises a loop incorporated in its sector and including radially of its sector two opposed outside poles of the same polarity and an inside pole of opposite polarity.

6. A system as claimed in claim 1, wherein the detectors alternate with the sectors.

7. A system as claimed in claim 1, wherein the detectors are radial of the sectors.

* * * * *